United States Patent [19]

Abolins

[11] Patent Number: 4,692,490

[45] Date of Patent: Sep. 8, 1987

[54] FLAME RETARDANT POLYPHENYLENE ETHER COMPOSITION CONTAINING POLYBROMINATED DIPHENYOXYBENZENE AND ANTIMONY OXIDE

[75] Inventor: Visvaldis Abolins, Delmar, N.Y.

[73] Assignee: General Electric Company, Selkirk, N.Y.

[21] Appl. No.: 841,441

[22] Filed: Mar. 19, 1986

[51] Int. Cl.$^4$ ................................................. C08K 5/06
[52] U.S. Cl. ....................................... 524/371; 524/412
[58] Field of Search ........................ 524/372, 373, 371

[56] References Cited

U.S. PATENT DOCUMENTS

| | | | |
|---|---|---|---|
| 3,639,506 | 2/1972 | Haaf | 524/467 |
| 3,671,487 | 6/1972 | Abolins | 524/467 |
| 3,760,003 | 9/1973 | Asadorian et al. | 524/371 |
| 4,152,316 | 5/1979 | Cooper et al. | 524/412 |
| 4,154,712 | 5/1979 | Lee | 524/412 |
| 4,355,126 | 10/1982 | Haaf et al. | 524/412 |

OTHER PUBLICATIONS

Eng Pi Chang et al., J. of Applied Polymer Science, vol. 21, No. 8, Aug. 1977, pp. 2167–2180.

*Primary Examiner*—Veronica P. Hoke
*Attorney, Agent, or Firm*—Hedman, Gibson, Costigan & Hoare

[57] ABSTRACT

The flame resistance of blends of polyphenylene ether resin and high impact polystyrene is upgraded by the inclusion of a combination of a polybrominated 1,4-diphenoxybenzene and antimony oxide. The resulting composition exhibits good thermal stability and is more resistant to undergoing juicing and blooming in comparison with the use of polybrominated diphenyl oxides.

13 Claims, No Drawings

FLAME RETARDANT POLYPHENYLENE ETHER COMPOSITION CONTAINING POLYBROMINATED DIPHENYOXYBENZENE AND ANTIMONY OXIDE

BACKGROUND OF THE INVENTION

1. Field of the Invention

The present invention relates to flame retardant polyphenylene ether compositions and, more specifically, to blends of a polyphenylene ether resin and a high impact polystyrene in which a polybrominated 1,4-diphenoxybenzene and antimony oxide are used in combination to provide better flame resistance with less juicing and good thermal stability.

2. Description of the Prior Art

Thermoplastic compositions of polyphenylene ether (oxide) resins and high impact polystyrenes are known to be useful for injection molding into a variety of articles characterized by highly desirable property profiles. With the wider use of these compositions in products where good flame resistance is an important requirement, the need has grown for additives that upgrade the flame retardance of the composition without detracting from other desired properties.

Common flame retardant additives for polyphenylene ether blends include halogenated, and especially brominated, compounds. Often these are used in combination with other flame retardant agents, such as aromatic phosphates, and with synergistic flame retardancy enhancers such as antimony oxide. The patent literature describes a number of polyphenylene ether compositions modified with such types of agents, for example, U.S. Pat. No. 3,639,506 (Haaf), U.S. Pat. No. 3,671,487 (Abolins), and U.S. Pat. No. 4,355,126 (Haaf and Reinhard). The conventional halogenated flame retardant compounds in particular include halogenated diphenyl ethers, for example, decabromodiphenyl oxide, as disclosed in the just mentioned U.S. Pat. No. 4,355,126.

Shortcomings usually associated with the use of brominated compounds include poor thermal stability (the compounds break down at the elevated temperatures normal for processing, and the byproducts contaminate the polymer and can hasten its degradation); and an unfortunate tendency to juice or bloom, that is, to migrate to the surface of the composition in the mold and to volatilize (this eventually leads to corrosion of the mold interiors due to the presence of bromine in the volatilized materials).

SUMMARY OF THE INVENTION

According to the present invention, new improved flame retardant blend compositions of a polyphenylene ether resin and a high impact polystyrene are provided by incorporating a combination of a polybrominated 1,4-diphenoxybenzene and antimony oxide. The polybrominated 1,4-diphenoxybenzenes used in the practice of this invention contain an average of three or more bromine atoms on each of the three benzene rings present in the molecule. The present blends represent an advance over conventional polyphenylene ether-high impact polystyrene compositions which use polybromodiphenyl oxide, alone, or in combination with antimony oxide. In particular, the blends of the present invention exhibit better flame retardancy, as well as better thermal stability and resistance to undergoing juicing and blooming than such prior art blends. Moreover, the degree of these improvements is larger than would be expected from, in essence, the addition of just one brominated phenoxy group to the diphenyl oxide molecule used conventionally as a flame retardant agent (e.g., decabromodiphenyl oxide).

The described blends can be extruded and molded into a wide variety of shaped plastic products, which are a further aspect of this invention.

DESCRIPTION OF THE INVENTION

Briefly, the compositions of the present invention, which are the chief aspect, comprise, thermoplastic blends of (a) a polyphenylene ether resin;
(b) a rubber modified, high impact polystyrene resin;
(c) a polybrominated 1,4-diphenoxybenzene; and
(d) antimony oxide.

The polyphenylene ethers (also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

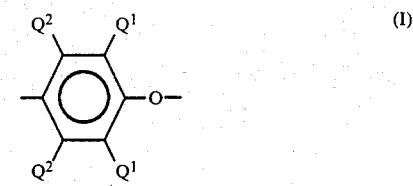

(I)

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.4 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (both monomeric and polymeric), o-hydroxyaryl oximes, and α-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

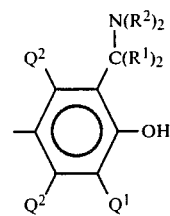

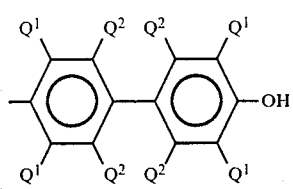

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals adjacent to the hydroxy group on the terminal unit of the polymer chain. During further processing and/or blending, the aminoalkylsubstituted end groups may undergo various reactions, probably involving a quinone methide-type intermediate of formula IV, below ($R^1$ is defined as above), with beneficial effects often including an increase in impact strength and compatibilization with other blend components.

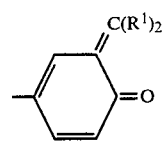

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

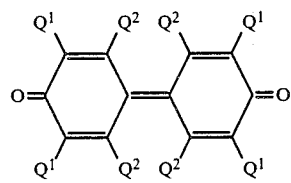

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The rubber modified, high impact polystyrene useful as component (b) in the present compositions can be selected from any of the materials known generally in the art as high impact polystyrenes, or HIPS. In general, these modified polystyrene resins are made by adding rubber during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPDM) rubbers, styrene-butadiene copolymers (SBR), and polyacrylates. The amount of rubber employed will vary, depending on such factors as the process of manufacture and individual requirements.

Included within this family of materials for purposes of the present invention are more recently developed forms in which such factors as the rubber particle size, the gel and cis contents of the rubber phase, and the rubber volume percent are regulated or controlled to achieve improvements in the impact resistance and other properties. These kinds of HIPS are described in the patent literature, including U.S. Pat. No. 4,128,602 (Abolins, Katchman and Lee, Jr.), and U.S. Pat. No. 4,528,327 (Cooper and Katchman), which are incorporated herein by reference.

Also contemplated as suitable for use are high impact polystyrenes having morphological forms which are sometimes referred to as core-shell, comprising particles of rubber encapsulated polystyrene dispersed in a matrix of polystyrene resin. Examples of this type are disclosed in U.S. Pat. No. 4,513,120 (Bennett, Jr. and Lee, Jr.), incorporated herein by reference, as well as the above-mentioned U.S. Pat. No. 4,528,327.

The polybrominated 1,4-diphenoxybenzene compound which constitutes component (c) of the composition is represented generally by the formula

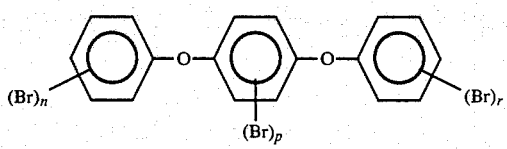

in which n, p and r represent the average number of bromine atoms on the respective rings and are integers from 3 to the maximum number of replaceable hydrogen atoms on each ring (5 in the case of n and r; 4 in the case of p). Preferably, n and r are 5, and p is 4. Thus, in preferred embodiments according to the invention, component (c) will be a compound of the formula

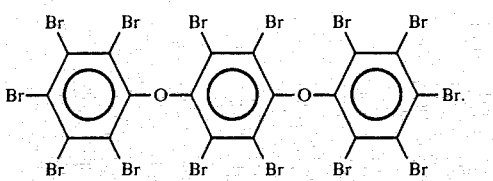

The polybrominated 1,4-diphenoxybenzenes may be prepared in accordance with standard bromination methods. A commercial example of the most preferred compound for this invention is Saytex 120, manufactured by Saytech, Inc., a division of Ethyl Chemicals.

In formulating the compositions in accordance with this invention, amounts for the above mentioned ingredients are selected which preferably fall within certain ranges, as follows:

| Ingredients | Amount, Parts by Weight |
|---|---|
| (a) Polyphenylene ether | 10 to 90 |
| (b) High impact polystyrene | 90 to 10 |
| TOTAL: | 100 parts by weight |
| (c) Polybrominated 1,4-diphenoxybenzene | 6 to 18 |
| (d) Antimony oxide | 2 to 6 per 100 parts by (a) and (b). |

The present kinds of compositions can also be formulated to include other ingredients in addition to those just described. These may be selected from among conventional materials commonly employed in polyphenylene ether resin blends, some of which are non-polymeric, others of which can be polymeric. Examples are plasticizers, mold release agents, melt viscosity reducers, colorants, stabilizers, antioxidants, mineral fillers (for example, clay), glass reinforcements, titanium oxides, lubricants, and so forth. Conventional amounts varying, for example, from less than 1 to greater than 50 percent by weight, per 100 percent by weight of the total composition, may be utilized.

The compositions can also be modified to include impact strength improving amounts of polymeric impact improvers, such as rubbery styrenic block copolymers, for example, di- or triblock copolymers of styrene and butadiene or the hydrogenated derivatives, i.e., styrene and ethylene/butylene.

The compositions can be prepared by any convenient method and, preferably, by forming a preblend of the ingredients, compounding the preblend by passing it through an extruder, and cooling the extrudate and cutting it into pellets or tablets. The tabletted composition can later be formed into the desired article, as by molding at elevated temperatures.

Because of their thermoplastic nature, the present compositions are particularly suitable for injection molding processes. Using standard procedures and conditions, these blends can be molded to various shapes and sizes, and the resulting products, besides having good flame retardancy, are characterized by excellent resistance to migration and blooming, good heat resistance, and good toxicological properties.

DESCRIPTION OF THE SPECIFIC EMBODIMENTS

The invention is further illustrated in the description below, which is set forth to show a preferred or best embodiment.

EXAMPLE

The compositions shown in Table 1 were prepared by forming a dry blend of the ingredients, compounding the blend by passage through a 28 mm Werner-Pfleiderer twin-screw extruder at about 570° F. melt temperature, and cooling and chopping the extrudate into pellets. The pellets were molded into 2.5 inch-long miniature test pieces, using a 4-ounce Newbury injection molding machine, a 500° F. melt temperature, and a 170° F. mold temperature. In addition, using the same conditions, molded test pieces having the dimensions 0.06 inch by 0.5 inch by 5 inches were prepared for the UL Subject 94 flame resistance test, and 4-inch (diameter) test discs were prepared for measurements of the yellowness index and Gardner impact strength.

TABLE 1

| Ingredients | Compositions Amount, Parts by Weight |
|---|---|
| Poly(2,6-dimethyl-1,4-phenylene ether) resin (PPO ®, General Electric Co., i.v. 0.47 dl./g., chloroform, 25° C.) | 15 |
| Rubber modified, high impact polystyrene resin (FG 834, American Hoechst Co., containing about 8–9% by wt. of rubber) | 80 |
| Polyethylene | 1.5 |
| Zinc sulfide | 0.15 |
| Zinc oxide | 0.15 |
| Styrene-butadiene-styrene block copolymer | 5 |
| Polybrominated 1,4-diphenoxy benzene (Saytex 120, Saytech, Inc.) | 12.2 |
| Antimony oxide (KR, Harshaw Chemical Co.) | 5 |

The polybrominated 1,4-diphenoxybenzene employed (Saytex 120) had the following characteristics:

| Melting Point | 370–380° C. |
|---|---|
| Bromine Content | Approx. 80% by weight |
| Aluminum Content | Less than 50 parts per million |
| Halide Content | Less than 100 parts per million as bromide |
| Volatiles | |
| (1) 2% wt. loss | 410° C. |
| (2) 5% wt. loss | 425° C. |
| (3) 10% wt. loss | 433° C. |

The various test pieces were exposed to common physical property tests in accordance with ASTM procedures and UL Subject 94 flame resistance procedures. The results are reported in Table 2.

TABLE 2

| Properties | |
|---|---|
| Tensile Strength | 6100 psi |
| Elongation | 66% |
| Notched Izod Impact Resistance | 2.5 ft. lb./in. of notch |
| Gardner Impact Strength | 20 in. lbs. |
| Heat Deflection Temperature, under load at 264 psi | 204° F. |
| Channel Flow Length, upon injection at 500° F. under 10,000 psi | 19.5 inches |
| Melt Viscosity, at 500° F. and 1500$^{-1}$ sec. | 1328 poise |
| UL Subject 94 Test | |
| 1/16 - inch thick samples | VO (4.2 sec.) |
| ⅛ - inch thick samples | VO (2.1 sec.) |
| Yellowness Index | 28.6 |

Other modifications and variations are possible and are contemplated as within the scope of the invention. It should be understood, therefore, that changes may be made in the particular embodiments shown without departing from the principles of the invention or sacrificing its chief benefits.

I claim:

1. A flame retardant thermoplastic composition comprising
   (a) a polyphenylene ether resin;
   (b) a rubber modified, high impact polystyrene resin;
   (c) a polybrominated 1,4-diphenoxybenzene in an amount which improves the flame retardancy of the combination of (a) and (b); and
   (d) antimony oxide in an amount which synergistically enhances the flame retardancy of the combination of (a), (b) and (c).

2. The composition of claim 1, in which component (a) is present in an amount from about 10 to about 90 parts by weight and component (b) is present in an amount from about 90 to about 10 parts by weight, based on 100 parts by weight of (a) and (b) combined.

3. The composition of claim 2, in which component (c) is present in an amount from about 6 to about 18 parts by weight and component (d) is present in an amount from about 2 to about 6 parts by weight, for each 100 parts by weight of (a) and (b) combined.

4. The composition of claim 1, in which the polyphenylene ether is a homopolymer or copolymer containing structural units of the formula

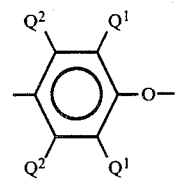

in which for each of these units independently each $Q^1$ is hydrogen, halogen, primary or secondary lower alkyl having up to seven carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

5. The composition of claim 1, in which the polyphenylene ether is poly(2,6-dimethyl-1,4-phenylene ether).

6. The composition of claim 5, in which the poly(2,6-dimethyl-1,4-phenylene ether) has an intrinsic viscosity of about 0.4 to 0.5 deciliters per gram in choroform at 25° C.

7. The composition of claim 1, in which the polyphenylene ether is poly(2,6-dimethyl-co-2,3,6-trimethyl-1,4-phenylene ether).

8. The composition of claim 1, in which component (c) has the formula

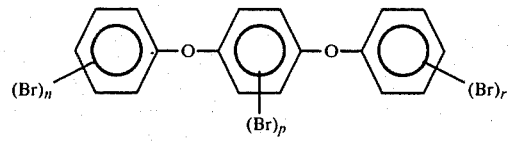

in which n, p and r represent the average number of bromine atoms on the rings and are integers from 3 to the maximum number of replaceable hydrogen atoms on each ring.

9. The composition of claim 1, in which component (c) has the formula

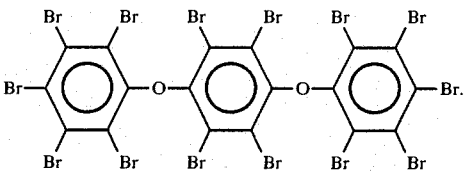

10. The composition of claim 1, which includes one or more additional ingredients selected from the group consisting of plasticizers, mold release agents, melt viscosity reducers, colorants, stabilizers, antioxidants, mineral fillers, glass reinforcements, titanium oxides and lubricants.

11. The composition of claim 1, which includes an impact strength improving amount of a polymeric impact improver.

12. The composition of claim 11, in which the polymeric impact improver is a styrene-butadiene-styrene block copolymer or hydrogenated derivative thereof.

13. An article molded from the composition of claim 1.

* * * * *